United States Patent [19]

Lewis

[11] Patent Number: 5,422,646
[45] Date of Patent: Jun. 6, 1995

[54] HIGH FREQUENCY MTI RADAR

[75] Inventor: Bernard L. Lewis, Ft. Washington, Md.

[73] Assignee: The United States of America as represented by the Secretary of the Navy, Washington, D.C.

[21] Appl. No.: 470,862

[22] Filed: Feb. 24, 1983

[51] Int. Cl.$^6$ .......................................... G01S 13/528
[52] U.S. Cl. .................................... 342/160; 342/162; 342/163; 342/137; 342/203; 342/194
[58] Field of Search .................. 343/7.7, 5 NQ, 5 FT; 342/160, 161, 162, 163, 164, 134, 135, 137, 194, 203

[56] References Cited

U.S. PATENT DOCUMENTS

| | | | |
|---|---|---|---|
| 3,962,704 | 6/1976 | Evans | 342/160 X |
| 3,987,442 | 10/1976 | McLeod, Jr. | 342/162 |
| 4,028,700 | 6/1977 | Carey et al. | 342/196 X |
| 4,083,049 | 4/1978 | Mattern et al. | 342/28 |
| 4,119,962 | 10/1978 | Lewis | 342/89 |
| 4,132,990 | 1/1979 | DiDomizio et al. | 342/159 X |
| 4,168,500 | 9/1979 | Brassaw | 342/149 |
| 4,168,501 | 9/1979 | Brassaw | 342/149 |
| 4,173,017 | 10/1979 | Burlage et al. | 342/162 |
| 4,237,461 | 12/1980 | Cantrell et al. | 342/194 |
| 4,292,635 | 9/1981 | Rittenbach | 342/194 |
| 4,298,942 | 11/1981 | Lee | 342/194 X |
| 4,404,561 | 9/1983 | Mulder et al. | 342/160 X |
| 4,489,320 | 12/1984 | Lewis et al. | 342/94 |
| 4,633,253 | 12/1986 | Stove et al. | 342/162 |
| 4,635,059 | 1/1987 | Ball | 342/117 |
| 4,862,177 | 8/1989 | Wong | 342/160 |
| 5,347,281 | 9/1994 | Lewis et al. | 342/160 |

OTHER PUBLICATIONS

O. Nourse, M. Crossfield, "Quad-Pulse Radar-A-frequenacy Agile Radar with Doppler Capability", Conference: Radar 1977, London, England 186–190.

*Primary Examiner*—John B. Sotomayor
*Attorney, Agent, or Firm*—Thomas E. McDonnell

[57] ABSTRACT

An MTI radar based on a comparison of the Doppler shifts of the original signal and a phase-reversed signal using pulse compression wherein the received signal is phase detected for in-phase and quadrature components relative to the IF. A Doppler-corrected pulse compressor produces a magnitude signal for the Doppler shift of the received signal from the sequence of in-phase and quadrature components. Another Doppler-corrected pulse compressor produces a magnitude signal for the Doppler shift of the received signal from the conjugates of the sequence of in-phase and quadrature components. The magnitude signal of the same Doppler shift of the two compressors are compared and the difference is the output of the MTI.

10 Claims, 2 Drawing Sheets

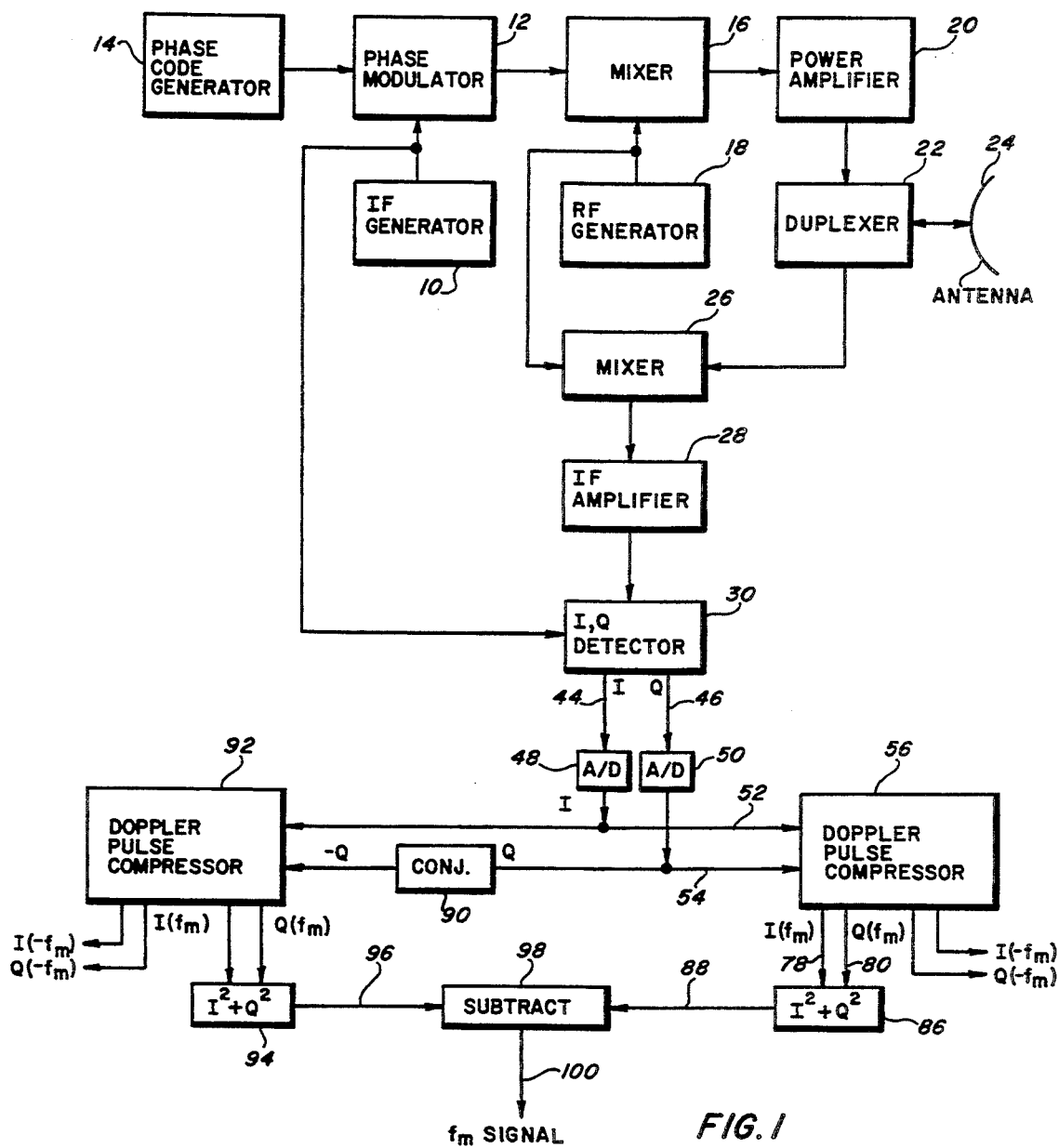
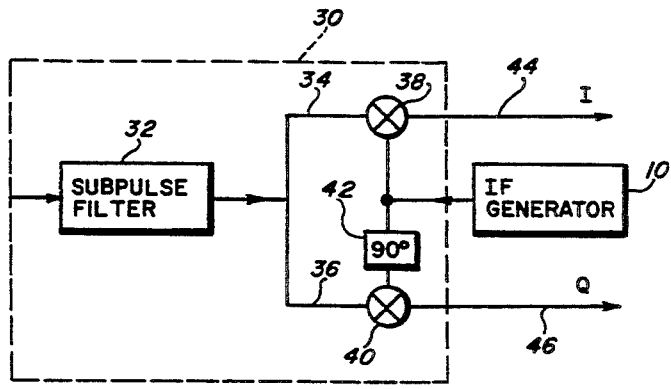

HIGH FREQUENCY MTI RADAR

BACKGROUND OF THE INVENTION

1. Field of the Invention

The invention relates generally to radar and in particular to MTI (moving target indicator) radar.

2. Description of the Prior Art

Radars of the moving target indicator (MTI) type detect targets that are moving while suppressing radar returns from fixed targets. MTI radars are particularly useful in detecting a moving target in the presence of clutter, i.e. returns from uninteresting stationary targets which may overwhelm the return from the moving target of interest. Some MTI have the further capability of determining the velocity of the target.

Because the target is moving at a velocity $v_r$ relative to the radar, the frequency of the moving target return is shifted by the doppler frequency, $f_d = 2 \cdot v_r / \lambda$, where $\lambda$ is the RF wavelength of the transmitted signal. Then, if the received radar signal is phase detected relative to a coherent intermediate frequency (IF) oscillator in the radar set, the detected phase varies between successive pulses because the position of the moving target has moved a corresponding phase length between pulses. Most MTI radars use a pulse-to-pulse comparison to extract moving targets from a stationary background. However, this procedure introduces several problems. First, multiple blind speeds are introduced. If the relative speed of the target is a multiple of PRF·$\lambda$/2, where PRF is the pulse repetition frequency, then no phase difference, within factors of $2\pi$, exist from pulse to pulse, and the target appears stationary although the signal is doppler shifted. Secondly, long interpulse periods, i.e. low PRFs, that are necessary to prevent range ambiguities permit distributed clutter echoes such as those from wind driven rain or chaff to decorrelate between pulses so that such echoes would not cancel upon comparison of two pulses. Thirdly, the repetitive pulsing requires long pulse trains at relatively low and fixed frequency, rendering difficult the use of high frequencies and frequency-agile radars.

SUMMARY OF THE INVENTION

Accordingly, one object of the invention is to provide an MTI radar that can operate at high frequencies.

Another object of the invention is to provide an MTI radar that can provide phase detection with a single radar pulse.

Yet a further object is to provide an MTI radar that eliminates blind speeds.

Yet another object is to provide an MTI radar that eliminates pulse-to-pulse decorrelations.

The invention is an MTI radar using phase-coded pulse compression. The return signal is phase detected and the magnitude of the signal at a Doppler shift is determined from the phase detected signal. The phase of the phase-detected signal is also changed so as to reverse any Doppler shifts. The magnitude of the signal at a Doppler shift from the phase-changed phase-detected signal is also determined. The magnitudes from the two Doppler determinations are then compared for the same Doppler shifts. Non-zero differences indicate a moving target.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic representation of an embodiment of the MTI radar of the invention.

FIG. 2 is a schematic representation of an (I,Q) phase detector.

DESCRIPTION OF THE PREFERRED EMBODIMENTS

Figure 3:
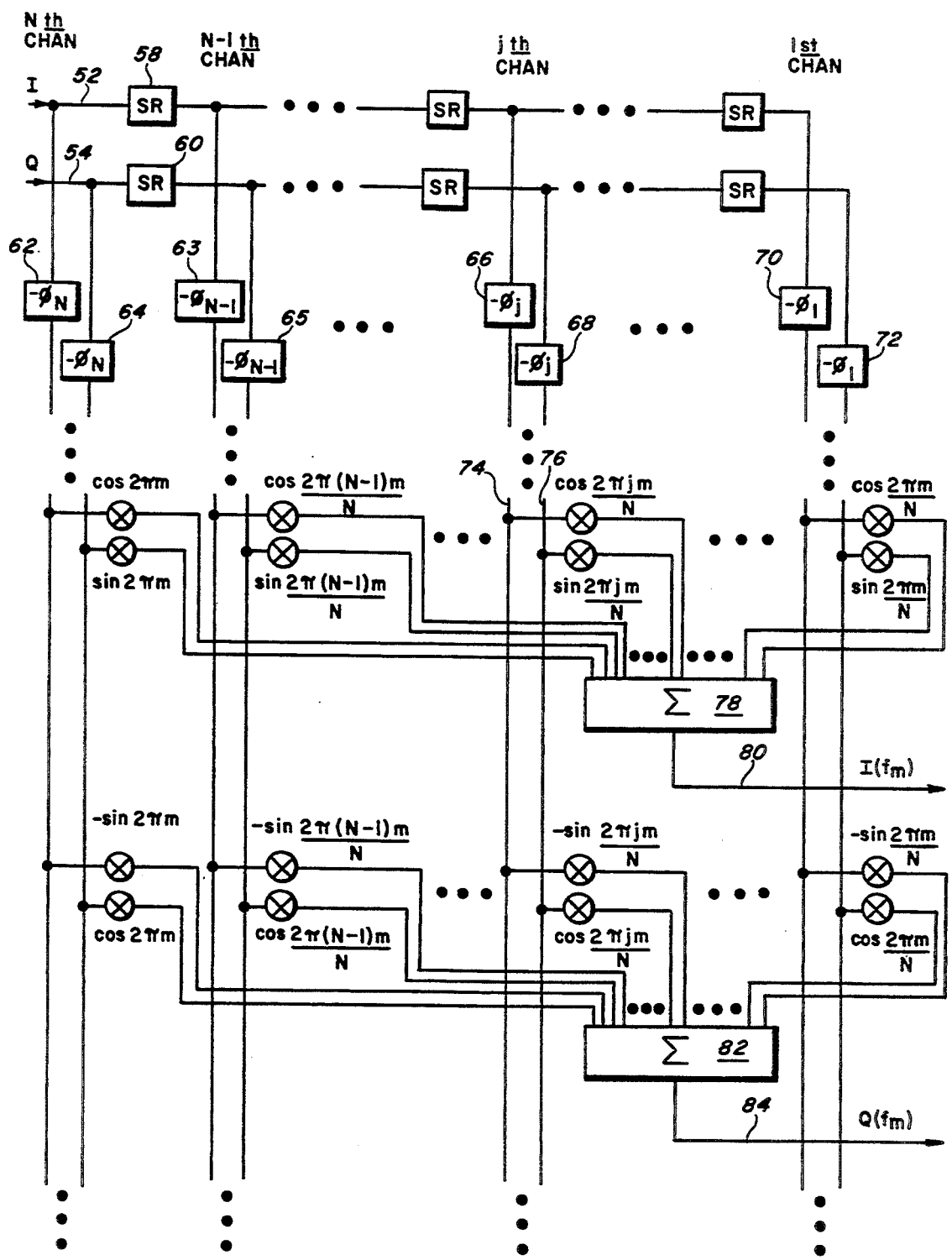
FIG. 3 is a schematic representation of a Doppler-corrected pulse compressor for determining the Doppler shifts in the return signal.

Referring now to the drawings, wherein like reference numerals designate identical or corresponding parts throughout the several views, and more particularly to FIG. 1 thereof showing a schematic diagram of a moving target indicator (MTI) radar of this invention. An intermediate frequency (IF) generator 10 produces a pulse of length T of electrical signal at the IF frequency. Because the radar operates on a single pulse, the coherency of the IF pulse needs to be maintained only for the length of the pulse. The IF waveform is phase modulated in the phase modulator 12 which is controlled by a phase code generator 14. The phase code generator 14 produces an N-long sequence of phases ($\phi_1, \phi_2, \ldots \phi_N$) which add to the phase of the IF in the phase modulator 12. For simplicity, a binary phase code, such as a Barker code, can be used. In a binary phase code, all the code phases are either 0° or 180° so that the phase modulation can be accomplished by inversion of the IF signal. Other more complex codes found useful in MTI pulse-compressed radar can also be used. The phase modulator 12 produces a modulated IF waveform of N subpulses of length t which is related to the pulse width T by the relation T=Nt.

The IF waveform is converted to the transmit frequency in a mixer 16 simultaneously fed by the phase modulator 12 and an RF generator 18. The transmit frequency is usually chosen to be the sum of the IF frequency and the RF frequency. The mixed waveform at the transmit frequency is then amplified in a power amplifier 20 and routed through a duplexer 22 to an antenna 24 which transmits the radar pulse.

The transmitted radar pulse after reflecting from a moving or stationary target is sometime later received on the antenna 24, and the duplexer 22 routes the receive signal to a mixer 26 which is also fed from the RF generator 18. There results a received waveform at an IF frequency near the frequency of the IF generator. The two signals will differ by the Doppler shift introduced by a moving target. An IF amplifier 28 amplifies the received IF waveform before it is fed into an (I,Q)-detector 30.

The (I,Q)-detector 30 is one form of phase detector and is referenced to the IF frequency. One embodiment of the (I,Q)-detector 30 is shown in schematic representation in FIG. 2. The received IF waveform is passed through a bandpass filter 32 tuned to the IF carrier frequency of bandwidth equal to the subpulse duration t, and that further passes the IF frequency and the Doppler shifted IF waveform. The IF waveform is then split between an in-phase channel 34 and a quadrature channel 36. The IF waveform is then fed into a multiplier 38 into which is also fed the signal from the IF generator 10. The IF waveform on the quadrature channel is likewise fed into a multiplier 40; however, a phase shifter 42 shifts the phase of the signal from the IF generator 10 by 90° before that signal reaches multiplier 40. The I-output 44 of the multiplier 38 on the in-phase channel provides the component of the received IF waveform in phase with the IF generator. Likewise, the Q-output 46 of the multiplier 40 of the quadrature channel provides the received IF component 90° out of phase with the IF generator. Detection of both I- and Q-components prevents blind speeds in target detection. The frequency of the IF generator is thereby removed but the Doppler frequencies are manifested in the time variations of the I-output 44 and Q-output 46. The instantaneous phase of the baseband (I,Q) signal is arctan (Q/I).

Referring again to FIG. 1, the I-output 44 and Q-output 46, which carry analog data, are fed into separate analog to digital (A/D) converters 48 and 50, respectively. Each A/D converter contains a sample-and-hold circuit which is clocked at the Nyquist rate of the phase code generator 14 which, in the case of the (I,Q)-detector 30, is the phase code rate N/T. The A/D converters 48 and 50 deliver parallel digital words to the digital I-line 52 and Q-line 54. Each of the I-line 52 and Q-line 54 comprises a parallel line bus with the number of parallel lines corresponding to the resolution of the A/D converters 48 and 50. The words on the I-line 52 and Q-line 54 are possibly changing at the rate of the phase code.

One of the purposes of the phase code generator 14 is to allow for pulse compression, i.e., to transmit a decompressed pulse of length T but to obtain the resolution and power associated with an equal-energy pulse of width $t=T/N$, where N is the length of the phase code. The pulse compression and extraction of the Doppler information is simultaneously accomplished by feeding both the I-line 52 and Q-line 54 into a Doppler-corrected pulse compressor 56, also known as a pulse compressor/Doppler steerer. A logic diagram of a Doppler-corrected pulse compressor 56 is shown in FIG. 3 in which the words on the digital I-line 52 and Q-line 54 are clocked into separate shift registers 58 and 60 which are the first of N-1 pairs of shift registers where N is the length of the phase code. The data are transferred a word at a time from shift register to shift register at the same rate at which the phase code generator 14 operates. The effect of the shift registers is to have digital data from different time periods simultaneously at different points of the shift register chain. The older data are shifted toward the right of the chain. The data are tapped at each node of the chain and will form at that node a $j^{th}$ data channel where $j=1$ is the oldest data. The inverse of the phase code is applied in reverse order in digital phase shifters 62–72. Thus, if the phase code is represented by the sequence of phase changes ($\phi_1, \phi_2, \ldots \phi_N$), then the data on the $j^{th}$ data channel is shifted $-\phi_j$. Because a binary code shifts phase only by $\phi=0°$ or $\phi=180°$, all changes in phase can be accomplished by multiplying both appropriate digital words by a negative one ($-1$) in the digital phase shifters. Those data which do not require phase shifting pass through the phase shifters 62–72 unchanged.

The components of a Doppler phase shift $f_m=m/T$ can be detected by tapping the I-line 74 of the $j^{th}$ data channel and multiplying that datum by cos $2\pi mj/N$. Likewise the Q-line 76 is tapped and the datum multiplied by sin $2\pi mj/N$. These two multiplied values and corresponding values on the other data channels are all added in a summer 78 to produce on the output line 80 the I-component for the Doppler shift $f_m$. Similarly the I-line 74 is tapped and the datum multiplied by $-\sin 2\pi mj/N$, and the Q-line 76 is tapped and the datum multiplied by cos $2\pi mj/N$. The 2N-fold sum in the summer 82 produces on its output line 84 the Q-component for the Doppler shift $f_m$. Both summers 78 and 82 are clocked at the phase code generator rate.

Components for many different $f_m$ can be calculated concurrently in the Doppler-corrected pulse compressor 56 including both positive and negative $f_m$ corresponding to relative velocities in opposite directions. The circuit of FIG. 3 can be implemented in discrete devices or a computer program can perform all the necessary data manipulations and arithmetic operations.

Referring again to FIG. 1, the output lines 78 and 80 for the I and Q component of the $f_m$ Doppler shift are fed into an $I^2+Q^2$ detector 86 which squares and adds the values of its two inputs and produces an unconjugated detection signal on its output line 88. The $I^2+Q^2$ detector 86 produces a signal that varies with the magnitude of the $f_m$ Doppler signal so that arbitrary phases are suppressed and may be considered as part of the Doppler-corrected pulse compressor. Similar $I^2+Q^2$ detectors are attached to the other Doppler shift outputs of the Doppler-corrected pulse compressor 56.

The data on the I-line 52 and Q-line 54 are also conjugated which is accomplished in the conjugator 90 which changes the sign of the Q-component. The conjugated data are fed into another Doppler-corrected pulse compressor 92 of the same design as that previously described. The components of the $f_m$ Doppler shift are fed into an $I^2+Q^2$ detector 94 to produce a magnitude of the conjugated detection signal on its output line 96.

The lines 96 and 88 for the conjugated and the unconjugated detection signals at the Doppler shift $f_m$ are led into a subtractor 98 that subtracts the conjugated from the unconjugated $f_m$ signal to produce the final detector signal for the $f_m$ Doppler shift on its output line 100. The $I^2+Q^2$ detectors 86 and 94 and the subtractor are duplicated for each desired Doppler shift, both positive and negative.

The two pulse compressors 56 and 92 can be combined in a more efficient design because many of the same quantities are calculated in both. Furthermore the conjugator 90 can be efficiently incorporated into the pulse compressor 92, for example, by changing the phase shifts for the Q-data or at other points in a combined design of the compressors 56 and 92.

The effect of conjugation is to reverse the relative velocity of a moving target. Echoes from moving targets that match a given filter in the unconjugated pulse compressor 56 so as to create a detection signal at a Doppler shift $f_m$ will match the filter for the negative of that Doppler frequency—$f_m$ in the conjugated compressor 92. A positive output from the subtractor 98 indicates a true Doppler frequency. A negative output indicates a spurious signal for that Doppler shifty, in actuality a Doppler shift of opposite sign.

Echoes from non-moving targets that exit from the pulse compressors 56 and 92 because of the finite range time sidelobes of the pulse compression technique will have the same magnitude in both compressors 56 and 92 and will cancel upon detection and subtraction. However, echoes from moving targets will exit at different frequencies on the compressors 56 and 92 and will not cancel upon subtraction.

In the above described embodiment, the RF waveform has been assumed to be continuous. Alternatively there can be a short pulse for each word of the phase code with relatively long separations between pulses. The extended waveform can detect smaller Doppler shifts. Furthermore multiple pulses can be transmitted for each phase code word to interlace different coded expanded pulses to increase the transmitted energy. This would require additional shift registers between the data channels of the Doppler-corrected pulse compressors.

The Doppler-corrected pulse compression can be performed with Fast Fourier Transform (FFT) circuits. The subtraction process will cancel non-moving clutter echoes from range cells that have not fully charged the FFT circuits.

Because this invention uses only a single pulse and does not rely on a change in signals between multiple pulses, returns from relatively stationary but transitory targets such as rain and chaff which return signals from one pulse but not the next are not detected as moving targets. The invention can be implemented in embodiments such as that shown previously which lack blind speeds and Doppler ambiguities. Because multiple pulse Doppler radars are detecting phase changes from one pulse to the next, they are required to use lower frequencies commensurate with the pulse repetition frequency. In contrast, this invention has no such requirement and much higher RF frequencies can be used allowing both design flexibility and the use of smaller antennas or smaller beam widths. Radars using a single pulse have a lower probability of intercept and can utilize frequency agility to further lower interception and to reduce jamming.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An MTI radar, comprising:
   a radar transmitter for transmitting a decompressed pulse according to a phase code impressed upon a signal generated at a frequency;
   a radar receiver for receiving a return signal resulting from said transmitted pulse and detecting components of said return signal at said frequency whereby an initial detection signal is generated;
   first means for compressing and determining a first Doppler shift of said initial detection signal according to said phase code whereby a signal is generated for an output corresponding to said first Doppler shift;
   means for changing the phase of said initial detection signal to reverse the Doppler shift in said initial detection signal;
   second means for compressing and determining a second Doppler shift of said changed initial detection signal according to said phase code whereby a signal is generated for an output corresponding to said second Doppler shift; and
   means for comparing the outputs of said first and second compressing and determining means, said compared outputs corresponding to the same determined Doppler shift.

2. An MTI radar, as recited in claim 1, wherein said radar receiver detects the components of said return signal in phase and in quadrature with the signal generated at said frequency and wherein said means for changing the phase of said initial detection signal comprises means to conjugate said components.

3. An MTI radar, as recited in claim 1, wherein said phase code is a binary phase code.

4. An MTI radar, as recited in claim 1, wherein said frequency is an IF frequency and further comprising an RF generator, a first mixer in which the phase code impressed signal is mixed with an RF signal from said RF generator, and a second mixer in which the return signal is mixed with said RF signal, the output of said second mixer being detected at said IF frequency.

5. An MTI radar, comprising:
   a phase code generator for producing a sequence of phase code at a coding frequency;
   a first signal generator for producing an unmodulated IF signal;
   a phase modulator for modulating the unmodulated IF signal to produce a modulated IF signal;
   transmitting means for transmitting as a signal the modulated IF signal at an RF frequency;
   receiving means for receiving a return signal resulting from a reflection of the transmitted signal and converting said return signal to a frequency near the IF frequency;
   an (I,Q)-detector for detecting a sequence of in-phase and quadrature components of said converted return signal relative to the unmodulated IF signal, said detecting being performed at the coding frequency;
   a first Doppler corrected pulse compressor using said phase code for producing on an output port a first signal of the magnitude of a first Doppler shift part of the return signal from the sequence of phase and quadrature components.
   a conjugator for producing a sequence from the conjugates of the sequence of in-phase and quarature components;
   a second Doppler-corrected pulse compressor using said phase code for producing on an output port a second signal of the magnitude of a second Doppler shift part of the return signal from the conjugated sequence;
   subtracting means for comparing the outputs of said first and second Doppler-corrected pulse compressor, said outputs being compared producing signals of the magnitude of the same Doppler shift, the difference signal produced by the subtracting means being a signal of a moving target.

6. An MTI radar, as recited in claim 5, wherein the phase code is a binary phase code.

7. An MTI radar, as recited in claim 5, further comprising A/D converters for digitizing the in-phase and quadrature components and operating at the coding frequency and wherein the conjugator reverses the sign of the Q-components and wherein the Doppler-corrected pulse compressors are digital Doppler-corrected pulse compressors.

8. An MTI radar, as recited in claim 7, wherein the phase code is a binary phase code.

9. An MTI radar, as recited in claim 7, wherein the Doppler-corrected phase compressor is a Fast Fourier Transform circuit.

10. A method of processing a phase-coded pulse-compressed radar return signal comprising the steps of:

phase detecting the sequence of in-phase and quadrature components of the return signal relative to the signal on which the phase-coding was impressed;

compressing the pulse and determining the magnitude of the return signal at a first Doppler shift from the sequence of in-phase and quadrature components using said phase code;

conjugating the sequence of in-phase and quadrature components;

compressing the pulse and determining the magnitude of the return signal at a second Doppler shift from the conjugated sequence; and comparing the amplitudes of the return signals at the same Doppler shift from the two compressions and determinations.

* * * * *